United States Patent [19]

Marty

[11] Patent Number: 4,700,928
[45] Date of Patent: Oct. 20, 1987

[54] VALVE ASSEMBLY

[75] Inventor: Garry R. Marty, Noblesville, Ind.

[73] Assignee: Masco Corporation of Indiana, Indianapolis, Ind.

[21] Appl. No.: 925,994

[22] Filed: Oct. 31, 1986

[51] Int. Cl.$^4$ .............................................. F16K 5/10
[52] U.S. Cl. .................................. 251/310; 251/208; 251/312; 251/368; 137/454.6
[58] Field of Search ........................... 137/315, 454.6; 251/304, 309, 310, 312, 368, 208

[56] References Cited

U.S. PATENT DOCUMENTS

| | | | |
|---|---|---|---|
| 3,561,729 | 2/1971 | Politz | 251/304 X |
| 3,645,493 | 2/1972 | Manoogian et al. | |
| 4,130,136 | 12/1978 | Garnier et al. | 251/368 X |
| 4,207,923 | 6/1980 | Giurtino | 251/309 X |
| 4,250,912 | 2/1981 | Knapp | 137/454.6 X |
| 4,283,041 | 8/1981 | Kujawski | |
| 4,425,935 | 1/1984 | Gonzalez | 137/315 |
| 4,453,567 | 6/1984 | MacDonald | |
| 4,572,231 | 2/1986 | Katayama | 251/309 X |

Primary Examiner—A. Michael Chambers
Assistant Examiner—John C. Fox
Attorney, Agent, or Firm—Edgar A. Zarins; Steven L. Permut

[57] ABSTRACT

A rotatable valve assembly for a faucet having an interchangable stainless steel plate which forms the interior flow passage of the valving member. The plate is secured to the valving member by depending tabs which engage reinforcement ribs formed in the valving member. The flow plate is of a one-piece stamped construction with the tabs formed coplanar with the plate and bent perpendicular to the plate prior to attachment of the flow plate. An aperture is formed in the plate which cooperates with an inlet port formed in the bottom wall of the valve body to control the water flow through the assembly.

20 Claims, 9 Drawing Figures

VALVE ASSEMBLY

BACKGROUND OF THE INVENTION

I. Field of the Invention

This invention relates to improvements in faucet valves of the type in which a separate valve assembly is provided for the hot and cold water supplies and, in particular, to a valve assembly having a stainless steel flow plate which, in part, forms the interior flow chamber to control fluid flow through the faucet thereby substantially reducing manufacturing and replacement costs.

II. Description of the Prior Art

Rotatable faucet valve assemblies are widely utilized to control fluid flow through a faucet. Generally, these assemblies include a valve member rotatably seated within a valve body and connected to the faucet handle by a valve stem extending therefrom. An aperture formed in the bottom of the valve member cooperates with a valve port to regulate the rate and volume of fluid flow. Examples of this type of valve assembly are disclosed in U.S. Pat. No. 3,645,493 and U.S. Pat. No. 4,453,567. Both of these valves serve to reduce the noise of operation of the faucet while eliminating leakage resulting from prolonged use.

Despite the operational advantages of the prior known valve assemblies, each valve member is only capable of being utilized in a specific valve assembly. Since different valve apertures are utilized in different faucet assemblies depending upon the intended function, each valve member has to be specially manufactured thereby substantially increasing tooling and manufacturing costs. Moreover, because the area around the valve aperture is subject to wear leading to eventual leakage, repair of the valve assembly requires replacement of the entire valve member. Finally, the configuration of the valve member, particularly the required interior passage, does not lend itself to efficient manufacture without an unacceptable number of defects.

SUMMARY OF THE PRESENT INVENTION

The present invention overcomes the disadvantages of the prior known valve assemblies by providing an assembly which can be efficiently manufactured while permitting application in a variety of faucet systems by interchanging the flow plate.

The valve assembly according to the present invention includes a valving member rotatably disposed within a valve body secured to the faucet assembly. The valving member includes an integrally formed valve stem that permits manual rotation of the valving member within the valve body. A stop member limits the rotational movement of the valving member and is fixedly secured within the valve body such that the valve stem extends therethrough. The stop member includes a stop tab which cooperates with the faucet handle to control the rotational movement of the valve member. The valve body includes an inlet port formed in the bottom thereof which accepts a tubular valve seal. The seal is biased into engagement with the valving member to control fluid flow while preventing leakage.

The valving member is generally tubular in shape with a flow plate connected to the bottom thereof by way of a series of connector tabs which engage vertical ribs formed on the valving member. The flow plate includes an inlet aperture offset from the axis of rotation and movable into and out of registry with the valve seal seated in the inlet port. The flow plate also cooperates with the valving member to form an interior laterally extending discharge passage through which water is discharged to the outlet port of the valve body. Thus, identical valving members can be utilized in different faucets merely by assembling the valve with a different plate in accordance with the intended function of the valve. Moreover, since the flow plate is subject to wear from the water flow, the faucet can be repaired without requiring replacement of the entire valve assembly. Finally, manufacturing costs for the valve assembly are substantially reduced through reduction of materials and quality problems resulting from the molding process.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figures 1, 2:
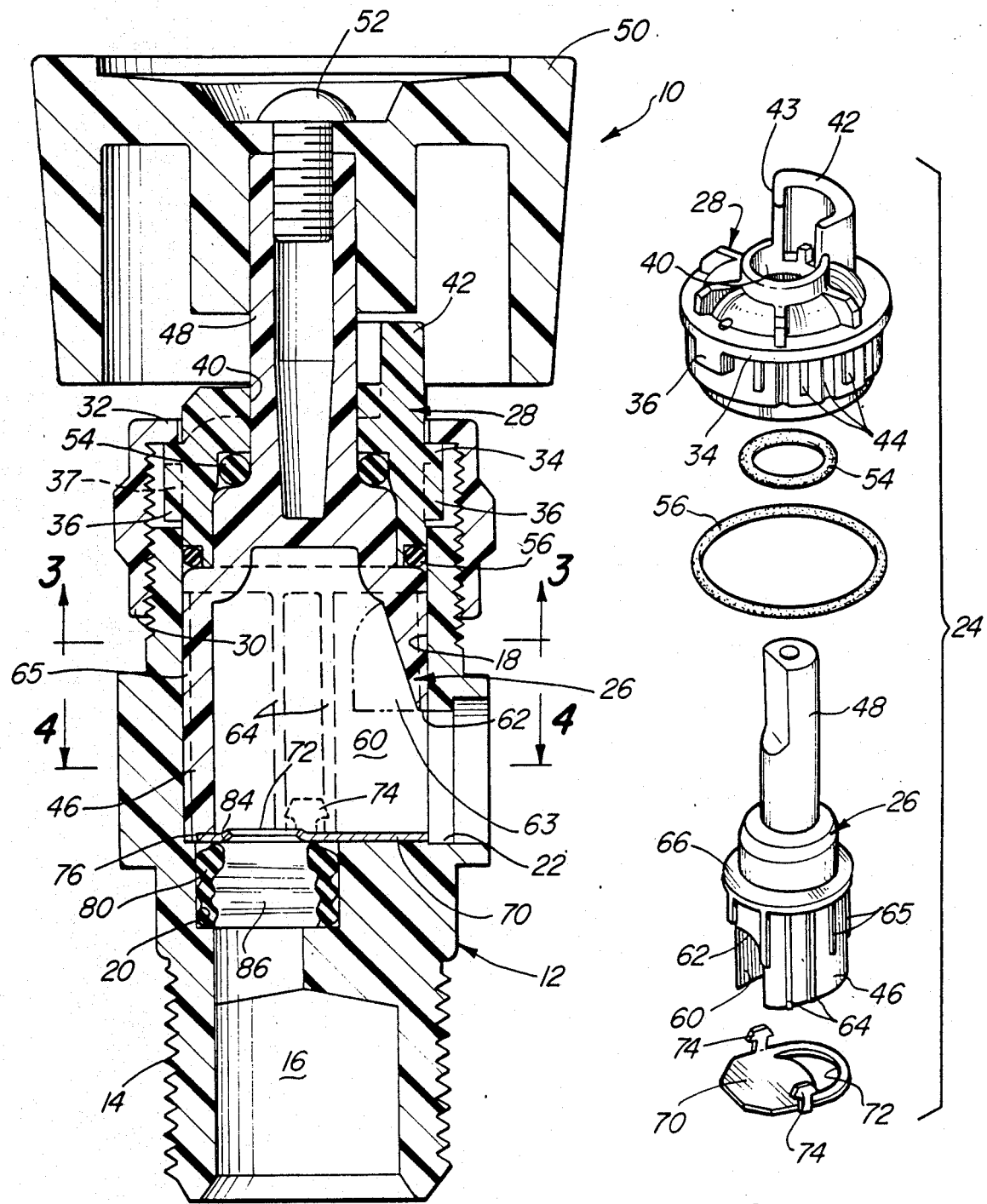
FIG. 1 is a vertical sectional view through a faucet valve embodying the valve assembly of the present invention and showing the valve in its full open position.
FIG. 2 is an exploded view of the valve assembly of the present invention.

Referring first to FIG. 1 of the drawing, there is shown a faucet valve 10 embodying the present invention. The valve 10 includes a generally cylindrical valve body 12 having a lower externally threaded portion 14 adapted to be connected in a conventional manner to a supply of pressurized hot or cold water. The pressurized water flows upwardly through a central bore 16 in the portion 14 of the valve body 12. The valve body 12 also includes a first bore 18 and a second bore 20 smaller than the first bore 18. The second bore 20 is offset from the longitudinal axis of the first bore 18 and connects the bore 16 to the bore 18 to form an inlet passage for the valve body 12. An outlet port 22 is formed in the side wall of the valve body 12 and is open to the first bore 18. During operation, to be subsequently described, water flows upwardly through the passages 16 and 20 and out the port 22.

Disposed within the larger first bore 18 is a valve assembly 24 which generally comprises a valving member 26 and a stop member 28. The valve assembly 24 is secured within the valve body 12 by a collar 30 which is threadably secured to the upper end of the valve body 12. The top flange 32 of the collar engages the upper surface of a shoulder 34 formed on the stop member 28 so that when the collar 30 is tightened, the valve assembly 24 will be properly positioned within the valve body 12. A pair of positioning tabs 36 formed on the collar engage notches 37 to ensure that the alignment of the valve assembly 24 within the valve body 12 is properly maintained.

Referring now to FIG. 2, the stop member 28 includes a central throughbore 40 adapted to receive the valving member 26. Integrally formed on the top of the stop member 28 is a detent member 42 having outer edges 43 (FIG. 8) which act as stop means to limit the rotational movement of the valving member 26. Preferably, the stop member 28 is an integrally formed plastic member having a plurality of ribs and grooves 44 extending axially below the shoulder 34. These ribs and grooves 44 are designed to reduce manufacturing costs by reducing the amount of material utilized to form the member 28 while also abating fluid flow noise during operation. The ribs 44 extend outwardly to engage the interior wall of the valve body 12.

The valving member 26 includes fluid flow housing 46 and an operating stem 48 integrally formed therewith. The stem 48 of the valving member 26 extends through the bore 40 of the stop member 28. An operating member or faucet handle 50 is connected to the upper end of the stem 48 by a screw 52 as shown in FIG. 1. The handle 50 is used to rotate the valving member 26 relative to the valve body 12 and stop member 28 in order to control the fluid flow through the valve 10 as will be subsequently described. An inner O-ring seal 54 fits over the valve stem 48 and provides a fluid seal between the valve stem and the stop member 28. An outer O-ring seal 56 is seated within the groove formed between the stop member 28 and the valving member 26 in order to provide a fluid seal between the valve body 12 and the valve assembly 24.

Figure 3:
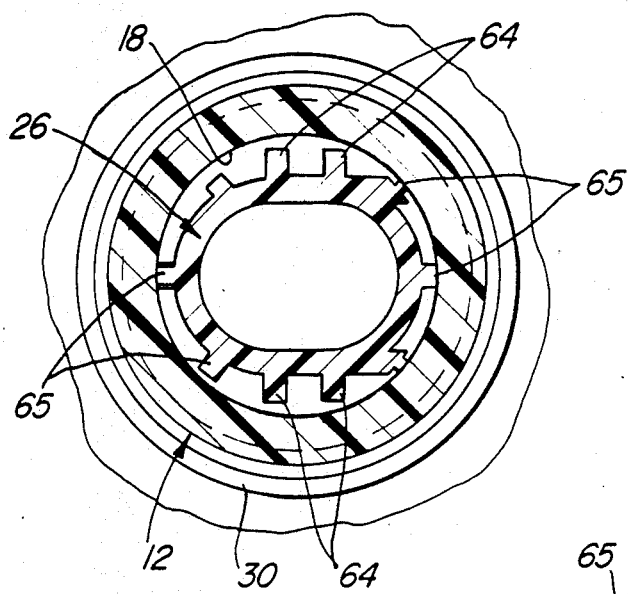
FIG. 3 is a cross-sectional view taken along line 3—3 of FIG. 1.
Figure 4:
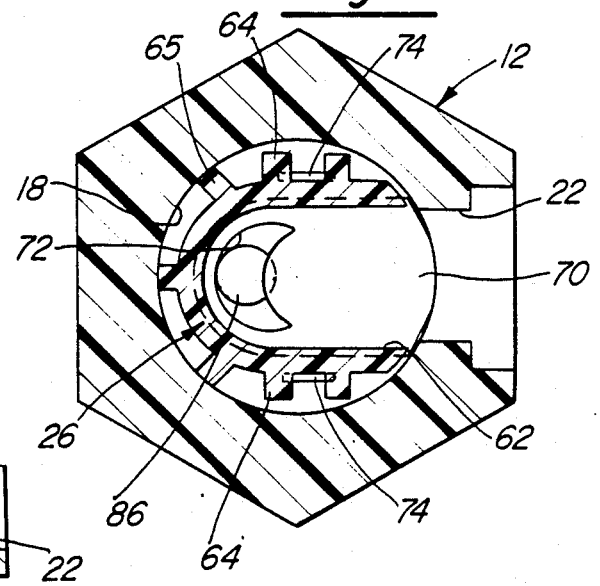
FIG. 4 is a cross-sectional view taken along line 4—4 of FIG. 1.

As best shown in FIGS. 1 and 2, the fluid flow housing 46, which is integrally formed with the valve stem 48 utilizing well known plastic molding techniques, at least partially defines an interior flow chamber 60 formed by a partial axial bore which is open to the bottom of the valving member 26. The housing 46 also includes a removed wall portion which defines the outlet passageway 62 of the flow chamber 60. As with the stop member, the housing 46 includes a series of axially extending reinforcement ribs 64 and 65. The ribs 64 extend from the bottom of the housing 46 to an annular shoulder 66 upon which the stop member 28 and O-ring 56 are seated while the ribs 65 extend from the shoulder 66 to a position short of the bottom of the valving member 26. Moreover, while the ribs 65 extend outwardly to engage the interior surface of the valve body 12, as shown in FIGS. 3 and 4, the ribs 64 do not thereby permitting fluid flow past the outer edge of the ribs 64 and below the ribs 65. By allowing full circumferential fluid flow around the valving member 26, flow is increased while flow noise is reduced. Furthermore, the configuration of the ribs 64 and 65 provides a metering function whereby the temperature of the water may be more efficiently controlled. In addition, the ribs 65 ensure that the valving member 26 is properly positioned while providing uniform rotation within the valve body 12. Formed at the top of the outlet passageway 62 is a flow control cut-away 63 adapted to reduce flow noise while facilitating smooth fluid flow through the chamber 60. This flow control cut-away 63 extends across the top of the outlet passageway 62 and directs fluid in the chamber 60 towards the passageway 62 while minimizing flow noise.

Secured to the bottom of the valving member 26 is a flow plate 70 having an aperture 72 formed therein. In the preferred embodiment of the flow plate 70, the aperture 72 has a substantially crescent shape and is offset from the center of rotation of the flow plate 70 and the valving member 26. The aperture 72 includes an upwardly extending lip 73 which acts as a funnel to channel the water into the chamber 60 thereby reducing fluid flow noise. Extending perpendicular to the flow plate 70 are at least two attachment tabs 74 adapted to detachably secure the plate 70 to the bottom of the valving member 26 thereby cooperating with the fluid flow housing 46 to form the flow chamber 60 and the outlet passage 62. As best shown in FIGS. 1 and 4, the tabs 74 engage pairs of spaced ribs 64 disposed on opposite sides of the valving member 26. Although the tabs 74 may be any configuration which ensures secure attachment, the tabs 74 of the present invention have a trapezoidal configuration whereby the longer base section engages the ribs 64 to retard disengagement of the tabs 74 from the ribs 64 while the tapered upper section facilitates insertion of the tabs 74 between each pair of ribs 64.

Figure 7:
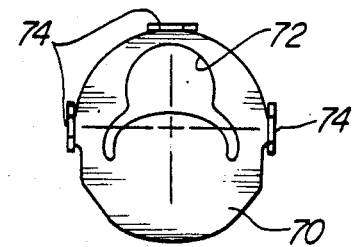
FIG. 7 is a bottom view of an alternative embodiment of the flow plate.
Figure 9:
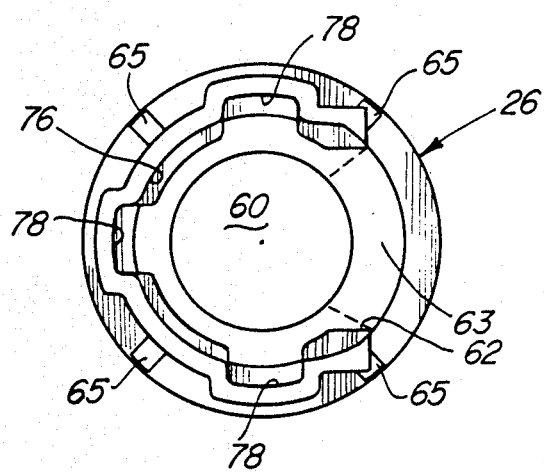
FIG. 9 is a bottom plan view of an alternative embodiment of the valving member.

In an alternative embodiment shown in FIG. 7, the plate 70 may be provided with three attachment tabs 74 to enhance the engagement between the plate 70 and the valving member 26. Such an alternative may be necessary in extreme pressure faucet assemblies. The embodiment shown in FIG. 7 also illustrates an alternative aperture configuration. In order to provide still further strength and support for this embodiment, the ribs 64 which engage the tabs 74 may be spanned by an integrally formed plastic member to enclose the opening between the ribs to thereby form slots 78 having a bottom opening within which the tabs 74 will fit (FIG. 9).

In both of the embodiments, the flow plate 70 is constructed of stainless steel designed to withstand wear and damage caused by the fluid flow and any particulates which may be found in the fluid. Preferably, the flow plate 70 is stamped from a stainless steel blank with the tabs 74 formed coplanar with the valving surface. Prior to attachment, the tabs 74 are bent upwardly perpendicular to the valving surface. Upon attachment of the flow plate 70 of the valving member 26, the peripheral edge of the plate 70 is protected by a sheathing lip 76 formed at the bottom of the housing. Due to the stamped construction of the flow plate 70, the peripheral edge thereof is left with a burr which can cause damage to contacting seal members. As the valving member 26 rotates, this burr may tear the seal necessitating frequent replacement. By including the lip 76 the burred edge of the flow plate is recessed within the end of the valving member 26 thereby preventing contact with the cooperating seals. Moreover, during the stamping process, the lip 73 is formed as a result thereof.

Figure 6:
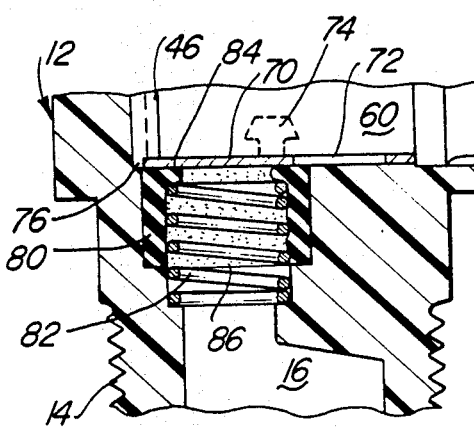
FIG. 6 is a fragmentary sectional view showing an alternate embodiment of the valve seal.

Referring now to FIG. 1 and 6, in order to ensure shutoff of fluid flow and prevent leakage, a valve seal 80 is seated in the second bore 20 of the valve body 12. With the valving member 26 disposed within the valve body 12, the flow plate 70 connected to the valving member has its exterior surface sealed against the top of the seal 80. The seal 80 is biased upwardly against the flow plate 70. In the embodiment shown in FIG. 1, the seal 80 comprises a resilient, substantially tubular member which is slightly compressed during use and therefore urged against the flow plate. Alternatively, as shown in FIG. 6, the seal 80 is urged against the flow plate 70 by a spring 82. The seal 80 forms an annular valving surface 84 and a fluid flow passage 86 which cooperate with the flow plate 70, particularly the aperture 72, to control the flow of water into the flow chamber 60. Thus, when the flow plate aperture 72 is aligned with the flow passage 86, as shown in FIGS. 1, 4 and 5, water can flow from the supply through the flow chamber 60 and out the outlet port 22 to the faucet spout.

Figure 5:
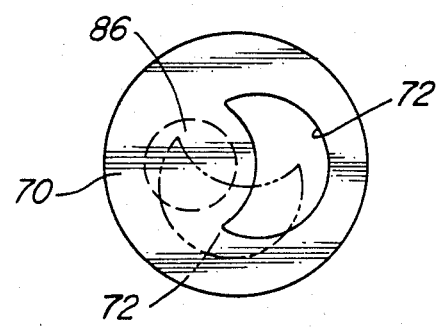
FIG. 5 is a sectional view illustrating the interaction between the flow plate aperture and the inlet passage of the faucet valve.

The faucet valve assembly 10 is shown in FIGS. 5 and 6 in its off or closed position in which the opening 72 in the flow plate 70 is out of registry with the inlet passage 86 of the seal 80. Shown in phantom in FIG. 5, the flow plate 70 is in a position in which the aperture 72 has just begun to communicate with the passage 86, assuming clockwise rotation of the valving member 26. When the handle 50 and therefore the valving member 26 are rotated, the flow plate 70 of the valving member rotates over the seal 80. Moreover, as the valving member 26 is rotated to bring the aperture 72 into registry with the passage 86, the outlet passageway 62 of the valving member 26 is similarly brought into registry with the outlet port 22 of the valve body 12 to form a flow path from the water supply to the faucet spout.

Figure 8:
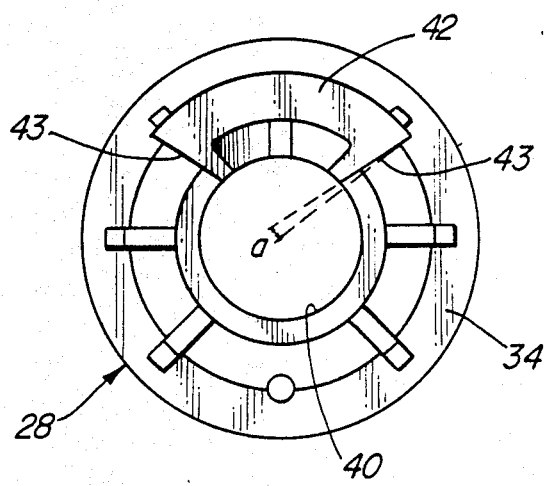
FIG. 8 is a top plan view of the stop member of the valve assembly.

The configuration and construction of the present invention provides numerous advantages in operation and durability. As best shown in FIGS. 2 and 8 and unlike the configuration of past known detent members which are formed perpendicular to the operating stem 48, the edges 43 of the detent member 42 of the present invention are formed at an acute angle "a" (approximately 3°) in order to maintain contact between the detent member 42 and the cooperating portion of the faucet handle 50. The angle "a" of the outer edges prevents the cooperating portion of the faucet handle 50 from circumventing the detent member 42 even under extreme torque conditions. In addition, in a preferred embodiment of the invention, the valving member 26 includes approximately 33% glass-filled nylon to improve the overall strength of the member, particularly the valve stem 48 which must be strong yet resilient in order to withstand the torque forces applied during use. By contrast, the stop member 28, including the detent 42, is constructed of a plastic material, preferably Celcon M50 plastic which prevents override by the operating member 50. The difference in composite strength ensures that the detent member 42 shears before the stem 48 breaks thereby permitting continued use of the faucet assembly.

Thus, the present invention provides a faucet valve assembly which can be economically manufactured for a variety of faucet requirements and which also can be readily repaired upon wear or damage to the valving member. Since the flow plate is subject to wear and damage as a result of the water flowing through and against it, instead of replacing the entire valve or valving member the flow plate may be independently replaced. Moreover, the stainless steel construction of the flow plate makes it resistant to damage and wear while retaining the advantages of plastic molded components for the remainder of the valve assembly. The configuration of the valving member, particularly the thin wall and open-ended construction, make it conducive to efficient manufacture using well-known molding techniques. Finally, the properties of the flow plate simplify manufacture by permitting uniform tooling for the valving member and merely attaching the specific flow plate to meet the end use requirements.

The foregoing detailed description has been given for clearness of understanding only and no unnecessary limitations should be understood therefrom as some modifications will be obvious to those skilled in the art without departing from the scope and spirit of the present invention as defined in the appended claims.

I claim:

1. A faucet valve assembly comprising:
   a valve body having a first bore, a second bore smaller than and opening into said first bore, said second bore offset from the longitudinal axis of said first bore, and an outlet port in said valve body open to said first bore;
   a valving member rotatable in said first bore of said valve body, said valving member including a plurality of axially extending ribs circumferentially spaced on the outer periphery of said valving member and having a flow chamber defined by a partial axial bore open to the bottom end of said valving member;
   a metal flow plate secured to said valving member, said flow plate enclosing the bottom end of said valve member to form said flow chamber and an outlet passageway capable of registry with said outlet port of said valve body, said flow plate having an inlet aperture offset from the axis of rotation of said valving member; and
   a substantially tubular valve seal seated in said second bore of said valve body, said valve seal having an annular valving surface cooperating with said flow plate to control the flow of water into said flow chamber and an inlet passage therethrough;
   wherein upon rotation of said valving member said inlet aperture of said flow plate is brought into registry with said inlet passage of said valve seal, said outlet passageway of said valving member being in registry with said outlet port of said valve body in at least some of the rotational positions of said valving member.

2. The faucet valve assembly as defined in claim 1 wherein said flow plate is stamped from a blank of a stainless steel material.

3. The faucet valve assembly as defined in claim 2 wherein the bottom end of said valving member includes a sheathing lip, said flow plate being recessed within the periphery of said sheathing lip upon attachment thereof to said valving member.

4. The faucet valve assembly as defined in claim 2 wherein said flow plate includes at least two integral attachment tabs, said attachment tabs being formed coplanar with said flow plate and bent perpendicular thereto.

5. The faucet valve assembly as defined in claim 4 wherein each of said attachment tabs engages at least two axial ribs to detachably secure said flow plate to said valving member.

6. The faucet valve assembly as defined in claim 4 wherein said valving member includes a plurality of axially extending slots, each of said attachment tabs extending into one of said slots to detachably secure said flow plate to said valving member.

7. The faucet valve assembly as defined in claim 1 wherein said valving member includes an integrally formed valve stem extending upwardly therefrom, said valve stem being connected to an operating member for rotating said valving member.

8. The faucet valve assembly as defined in claim 7 and further comprising a fixed stop member secured in the upper end of said valve body, stop means on said stop member and operating member for limiting rotation of the operating member between full open and closed positions of said valving member.

9. The faucet valve assembly as defined in claim 8 wherein said stop means on said stop member comprises a detent member having opposite ends adapted to cooperate with said stop means on the operating member, said opposite ends of said detent member being formed at an acute angle to the perpendicular to facilitate engagement between said stop means.

10. The faucet valve assembly as defined in claim 1 wherein said outlet passageway of said valving member includes a flow control notch formed at an upper end of said passageway.

11. The faucet valve assembly as defined in claim 1 wherein said valve seal includes means urging said seal into sealing engagement with said valve plate.

12. A faucet valve assembly comprising:
a valve body having a first bore, a second bore smaller than and opening into said first bore, said second bore offset from the longitudinal axis of said first bore, and an outlet port in said valve body open to said first bore;
a valving member rotatable in said first bore of said valve body, said valving member including a plurality of axially extending ribs circumferentially spaced on the outer periphery of said valving member and having a flow chamber defined by a partial axial bore open to the bottom end of said valving member, the bottom end of said valving member including a sheathing lip;
a stamped stainless steel flow plate secured to the bottom of said valving member, said flow plate being recessed within the periphery of said sheathing lip and enclosing the bottom end of said valve member to form said flow chamber and an outlet passageway capable of registry with said outlet port of said valve body, said flow plate having an inlet aperture offset from the axis of rotation of said valving member; and
a substantially tubular valve seal seated in said second bore of said valve body, said valve seal having an annular valving surface cooperating with said flow plate to control the flow of water into said flow chamber and an inlet passage therethrough;
wherein upon rotation of said valving member said inlet aperture of said flow plate is brought into registry with said inlet passage of said valve seal, said outlet passageway of said valving member being in registry with said outlet port of said valve body in at least some of the rotational positions of said valving member.

13. The faucet valve assembly as defined in claim 12 wherein at least one of said axially extending ribs of said valving member extend outwardly to engage the inner wall of said first bore of said valve body in order to rotationally support said valving member within said valve body.

14. The faucet valve assembly as defined in claim 12 wherein said flow plate includes a plurality of attachment tabs extending perpendicular thereto, said tabs engaging said ribs of said valving member to detachably secure said flow plate to said valving member.

15. The faucet valve assembly as defined in claim 12 wherein said inlet aperture of said flow plate includes an upwardly extending peripheral lip to enhance fluid flow and reduce flow noise.

16. The faucet valve assembly as defined in claim 12 wherein said valve seal includes means urging said seal into sealing engagement with said valve plate.

17. The faucet valve assembly as defined in claim 16 wherein said valve seal comprises an axially compressible seal member disposed within said second bore such that said seal member is biased into sealing engagement with said valve plate.

18. A valving member for use in a faucet valve assembly having a valve body with inlet and outlet ports, an operating member and a fixed stop member secured in the upper end of the valve body, said valving member comprising:
a flow housing having an axially extending cavity open to the bottom end of said housing, said housing including a plurality of axially extending reinforcement ribs extending outwardly into contact with the valve body in order to rotationally support said valving member within the valve body and a sheathing lip formed at the bottom end of said flow housing;
a valve stem integrally formed with said flow housing, said valve stem extending through the fixed stop member and attached to the operating member to control rotation of said valving member within the valve body; and
a metal flow plate secured to the bottom of said flow housing and recessed within the periphery of said sheathing lip to form a flow chamber and an outlet passageway capable of registry with the outlet port of the valve body, said flow plate having an inlet aperture offset from the axis of rotation of said valving member and at least one attachment tab extending perpendicular thereto, each of said attachment tabs engaging a pair of reinforcement ribs of said flow housing to detachably secure said flow plate to said flow housing.

19. The valving member as defined in claim 18 wherein said cavity of said flow housing includes a flow control notch formed above and in fluid communication with said outlet passageway.

20. The valving member as defined in claim 18 wherein said inlet aperture of said flow plate includes an upwardly extending peripheral lip to enhance fluid flow and reduce flow noise.

* * * * *